United States Patent [19]

Hong

[11] Patent Number: 5,355,177
[45] Date of Patent: Oct. 11, 1994

[54] LUMINANCE/COLOR SIGNAL SEPARATION APPARATUS

[75] Inventor: Sung H. Hong, Seoul, Rep. of Korea

[73] Assignee: Goldstar Co., Ltd., Seoul, Rep. of Korea

[21] Appl. No.: 137,498

[22] Filed: Oct. 15, 1993

[30] Foreign Application Priority Data

Feb. 1, 1993 [KR] Rep. of Korea .............. 1322/1993

[51] Int. Cl.$^5$ .............................................. H04N 5/21
[52] U.S. Cl. ................................. 348/609; 348/664
[58] Field of Search ............................... 358/31, 36, 37; 348/609, 610, 663–670; H04N 5/21

[56] References Cited

U.S. PATENT DOCUMENTS

| | | | |
|---|---|---|---|
| 4,969,033 | 11/1990 | Yamada | 348/609 |
| 5,047,840 | 9/1991 | Miki | 358/31 |
| 5,155,583 | 10/1992 | Yoshimura et al. | 358/31 |

Primary Examiner—Victor R. Kostak
Attorney, Agent, or Firm—Fliesler, Dubb, Meyer & Lovejoy

[57] ABSTRACT

A luminance/color signal separation apparatus comprising an analog/digital converter for converting a composite video signal inputted therein into a digital composite video signal, an adjacent signal detection circuit for detecting from the composite video signal from the analog/digital converter a target composite video signal from which luminance and color signals are to be separated and vertically and horizontally composite video signals, two-dimensional, horizontal and vertical pseudo median filtering circuits for outputting first to third luminance signals, respectively, a control signal generation circuit for generating horizontal and vertical control signals, a luminance signal selection circuit for selecting one of the first to third luminance signals in response to the horizontal and vertical control signals and outputting the selected luminance signal as the final luminance signal, a delay unit for delaying the target composite video signal by a predetermined time period for a timing matching with the final luminance signal, a color signal extractor for removing the final luminance signal from the delayed target composite video signal to extract a color signal therefrom, and a band pass filtering circuit for filtering the color signal from the color signal extractor at a narrow band to remove a color spread phenomenon thereof.

6 Claims, 7 Drawing Sheets

| Pa | | Pb | | Pc | LINE $l$ |
| --- | --- | --- | --- | --- | --- |
| Pd | | Pe | | Pf | LINE $l+1$ |
| Pg | | Ph | | Pi | LINE $l+2$ |

FIG. 9

| H1 | H2 | H3 | |
|---|---|---|---|
| Y+C | Y'−C | Y+C | LINE $i$ |
| Y−C | Y'+C | Y'−C | LINE $i+1$ |
| Y+C | Y'−C | Y+C | LINE $i+2$ |

Y', Y: LUMINANCE
C: COLOR

LUMINANCE/COLOR SIGNAL SEPARATION APPARATUS

BACKGROUND OF THE INVENTION

1. Field of the Invention

The present invention relates in general to a television receiver which is capable of processing a quadrature-modulated composite video signal, and more particularly to a luminance/color signal separation apparatus which is capable of suppressing a cross luminance phenomenon and a cross color phenomenon which are liable to occur when luminance and color signals are separated from a composite video signal, a correlation of which is high all vertically, horizontally and diagonally, is vertically low and horizontally high or is vertically high and horizontally low.

2. Description of the Prior Art

Generally, in order to efficiently use a frequency band in a quadrature modulation broadcasting system such as, for example, a NTSC broadcasting system, a composite video signal is transmitted to a television receiver, with a color signal interleaved in a luminance signal. In the television receiver, the luminance and color signals must perfectly be separated from the composite video signal. In this case, a cross luminance phenomenon of the luminance signal and a cross color phenomenon of the color signal may take place when the luminance and color signals are not perfectly separated from the composite video signal.

In one conventional apparatus for separating the luminance and color signals from the composite video signal using linear filters, the color signal is detected from the composite video signal utilizing a band pass filter and a low pass filter. In this case, a color subcarrier is employed as center frequencies of the band pass filter and the low pass filter.

In another apparatus for separating the luminance and color signals from the composite video signal using the linear filters, the color signal is detected from the composite video signal utilizing a characteristic that the color signal is inverted in phase every line and every frame in the case where the composite video signal belongs to the quadrature modulation broadcasting system. In this case, the color signal is detected from the composite video signal on the basis of an arithmetic operation of line and frame comb filters which can be expressed by the following equation:

$$\tfrac{1}{2}P1 - \tfrac{1}{4}(P0 - P2)$$

where, P0 is the composite video signal inputted by the apparatus, P1 is a composite video signal which is obtained by delaying the composite video signal P0 by one line using the line comb filter and P2 is a composite video signal which is obtained by delaying the composite video signal P1 by one line using the line comb filter.

In a further apparatus for separating the luminance and color signals from the composite video signal using the linear filters, the color signal is detected from the composite video signal utilizing a series connected band pass filter and line or frame comb filter in consideration of a resolution of the luminance signal.

In yet another apparatus for separating the luminance and color signals from the composite video signal using the linear filters, the color signal is detected from the composite video signal utilizing a low pass filter and a line or frame comb filter depending on motion of the composite video signal. In this case, the color signal is detected from the composite video signal on the basis of an arithmetic operation of the line or frame comb filter which can be expressed by the following equation:

$$\tfrac{1}{2}P1 + \tfrac{1}{4}(P0 + P2)$$

where, P0 is the composite video signal inputted by the apparatus, P1 is a composite video signal which is obtained by delaying the composite video signal P0 by one line using the line comb filter and P2 is a composite video signal which is obtained by delaying the composite video signal P1 by one line using the line comb filter.

In one of conventional apparatus for separating the luminance and color signals from the composite video signal using non-linear filters, the color signal is detected from the composite video signal utilizing a logical comb filter which is shown in "IEEE 1985 Consumer electronic Vol. 31 No. 3 pp 240–254", SONY. In this case, the color signal is detected from the composite video signal on the basis of an arithmetic operation of the logical comb filter which can be expressed by the following equation:

$$\mathrm{Max}\{\mathrm{Min}(P0,-P1), \mathrm{Min}(-P1, P2)\} + \mathrm{Min}\{\mathrm{Max}(P0,-P1), \mathrm{Max}(-P1, P2)\} \text{ or}$$

$$\mathrm{Max}\{\mathrm{Min}(-P0, P1, P2), 0\} + \mathrm{Min}\{\mathrm{Max}(-P0, P1, P2), 0\}$$

where, P0 is the composite video signal inputted by the apparatus, P1 is a composite video signal which is obtained by delaying the composite video signal P0 by one line and P2 is a composite video signal which is obtained by delaying the composite video signal P1 by one line.

The luminance signal is detected by removing the color signal detected on the basis of the above arithmetic operation from the inputted composite video signal.

However, in the above-mentioned conventional apparatus for separating the luminance and color signals from the composite video signal using the linear filters, the luminance/color signal separation apparatus employing the band pass filter and the low pass filter has a disadvantage in that horizontal resolution is reduced because a cross luminance phenomenon of the luminance signal such as a dot crawling phenomenon and a cross color phenomenon of the color signal such as a rainbow pattern color spread phenomenon may take place when the composite video signal has a horizontal or diagonal variation.

Also, the luminance/color signal separation apparatus employing the line comb filter has a disadvantage in that a vertical resolution is reduced because a cross luminance phenomenon of the luminance signal such as a dot hanging phenomenon and a cross color phenomenon of the color signal may take place when the composite video signal has a vertical or diagonal variation.

Further, the luminance/color signal separation apparatus employing the frame comb filter has a disadvantage in that a cross-talk phenomenon occurs between the luminance and color signals since the luminance and color signals are not perfectly separated when the composite video signal has a variation in time.

On the other hand, the above-mentioned conventional apparatus for separating the luminance and color signals from the composite video signal using the non-linear filters has a disadvantage in that the luminance and color signals are not perfectly separated when the composite video signal has the horizontal or diagonal variation. Also, the luminance signal cannot directly be obtained.

SUMMARY OF THE INVENTION

Therefore, the present invention has been made in view of the above problems, and it is an object of the present invention to provide a luminance/color signal separation apparatus in which a luminance signal is extracted from a composite video signal using pseudo median filtering circuits as non-linear filtering circuits and a color signal is obtained by removing the extracted luminance signal from the composite video signal, so that a cross luminance phenomenon of the luminance signal and a cross color phenomenon of the color signal can be avoided when the luminance and color signals are separated from the composite video signal in the case where the composite video signal has all vertical, horizontal and diagonal variations.

It is another object of the present invention to provide a luminance/color signal separation apparatus which is capable of avoiding a cross luminance phenomenon and a cross color phenomenon when luminance and color signals are separated from a composite video signal having a horizontal variation.

It is yet another object of the present invention to provide a luminance/color signal separation apparatus which is capable of avoiding a cross luminance phenomenon and a cross color phenomenon when luminance and color signals are separated from a composite video signal having a vertical variation.

In accordance with the present invention, the above and other objects can be accomplished by a provision of a luminance/color signal separation apparatus comprising analog/digital conversion means for sampling a composite video signal inputted therein at a desired rate and converting the sampled composite video signal into a digital composite video signal; adjacent signal detection means for detecting from the composite video signal from said analog/digital conversion means a target composite video signal from which luminance and color signals are to be separated and composite video signals vertically and horizontally adjacent to the target composite video signal; two-dimensional pseudo median filtering means for obtaining a correlation of the composite video signal from said analog/digital conversion means and the target composite video signal and the vertically and horizontally adjacent composite video signals from said adjacent signal detection means and filtering those composite video signals to extract a first luminance signal therefrom when the target composite video signal has vertical, horizontal and diagonal variations; horizontal pseudo median filtering means for obtaining a correlation of the target composite video signal and the horizontally adjacent composite video signals from said adjacent signal detection means and filtering those composite video signals to extract a second luminance signal therefrom; vertical pseudo median filtering means for obtaining a correlation of the target composite video signal and the vertically adjacent composite video signals from said adjacent signal detection means and filtering those composite video signals to extract a third luminance signal therefrom; control signal generation means for generating horizontal and vertical control signals to select one of the first to third luminance signals from said two-dimensional, horizontal and vertical pseudo median filtering means; luminance signal selection means for selecting one of the first to third luminance signals from said two-dimensional, horizontal and vertical pseudo median filtering means in response to the horizontal and vertical control signals from said control signal generation means and outputting the selected luminance signal as the final luminance signal; delay means for delaying the target composite video signal from said adjacent signal detection means by a predetermined time period for a timing matching with the final luminance signal from said luminance signal selection means; color signal extraction means for removing the final luminance signal from said luminance signal selection means from the target composite video signal delayed by said delay means to extract a color signal therefrom; and band pass filtering means for filtering the color signal from said color signal extraction means at a narrow band to remove a color spread phenomenon thereof.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENT

Figure 1:
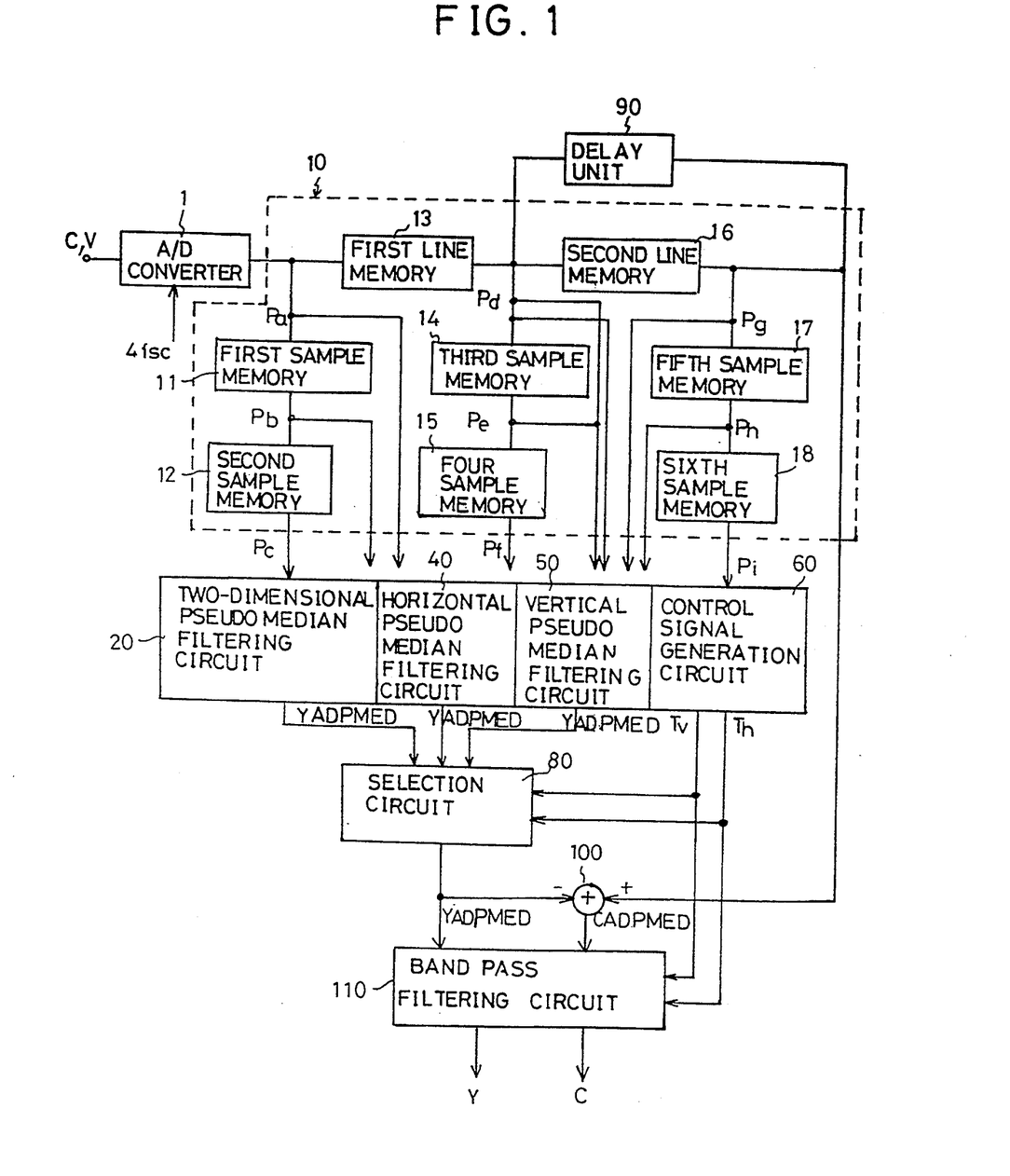
FIG. 1 is a block diagram of a luminance/color signal separation apparatus in accordance with the present invention.

Referring to FIG. 1, there is shown a block diagram of a luminance/color signal separation apparatus in accordance with the present invention. As shown in this drawing, the luminance/color signal separation apparatus comprises an analog/digital (A/D) converter 1 for sampling a composite video signal inputted therein at a desired rate and converting the sampled composite video signal into a digital composite video signal, and an adjacent signal detection circuit 10 for detecting from the composite video signal from the A/D converter 1 a target composite video signal from which luminance and color signals are to be separated and composite video signals vertically and horizontally adjacent to the target composite video signal.

A two-dimensional pseudo median filtering circuit 20 is provided in the luminance/color signal separation apparatus to obtain a correlation of the composite video signal from the A/D converter 1 and the target composite video signal and the vertically and horizontally adjacent composite video signals from the adjacent signal detection circuit 10 and filter those composite video signals to extract a first luminance signal Ypmed therefrom when the target composite video signal has vertical, horizontal and diagonal variations.

A horizontal pseudo median filtering circuit 40 is also provided in the luminance/color signal separation apparatus to obtain a correlation of the target composite video signal and the horizontally adjacent composite video signals from the adjacent signal detection circuit 10 and filter those composite video signals to extract a second luminance signal Ypmedh therefrom.

A vertical pseudo median filtering circuit 50 is also provided in the luminance/color signal separation apparatus to obtain a correlation of the target composite video signal and the vertically adjacent composite video signals from the adjacent signal detection circuit 10 and filter those composite video signals to extract a third luminance signal Ypmedv therefrom.

A control signal generation circuit 60 is also provided in the luminance/color signal separation apparatus to generate horizontal and vertical control signals Th and Tv to select one of the first to third luminance signals Ypmed, Ypmedh and Ypmedv from the two-dimensional, horizontal and vertical pseudo median filtering circuits 20, 40 and 50.

The luminance/color signal separation apparatus also comprises a luminance signal selection circuit 80 for selecting one of the first to third luminance signals Ypmed, Ypmedh and Ypmedv from the two-dimensional, horizontal and vertical pseudo median filtering circuits 20, 40 and 50 in response to the horizontal and vertical control signals Th and Tv from the control signal generation circuit 60 and outputting the selected luminance signal as the final luminance signal Yadpmed, a delay unit 90 for delaying the target composite video signal from the adjacent signal detection circuit 10 by a predetermined time period for a timing matching with the luminance signal Yadpmed from the luminance signal selection circuit 80, a color signal extractor 100 for removing the luminance signal Yadpmed from the luminance signal selection circuit 80 from the target composite video signal delayed by the delay unit 90 to extract a color signal Cadpmed therefrom, and a band pass filtering circuit 110 for filtering the color signal Cadpmed from the color signal extractor 100 at a narrow band to remove a color spread phenomenon thereof.

The adjacent signal detection circuit 10 includes a first sample memory 11 for delaying the composite video signal pa from the A/D converter 1 by two samples, a second sample memory 12 for delaying the resultant composite video signal Pb from the first sample memory 11 by two samples, a first line memory 13 for delaying the composite video signal pa from the A/D converter 1 by one line, a third sample memory 14 for delaying the resultant composite video signal Pd from the first line memory 13 by two samples and outputting the resultant composite video signal Pe as the target composite video signal, and a fourth sample memory 15 for delaying the target composite video signal Pe from the third sample memory 14 by two samples.

A second line memory 16 is provided in the adjacent signal detection circuit 10 to delay the resultant composite video signal Pd from the first line memory 13 by one line.

A fifth sample memory 17 is also provided in the adjacent signal detection circuit 10 to delay the resultant composite video signal Pg from the second line memory 16 by two samples.

A sixth sample memory 18 is also provided in the adjacent signal detection circuit to delay the resultant composite video signal Ph from the fifth sample memory 17 by two samples.

Figure 2:
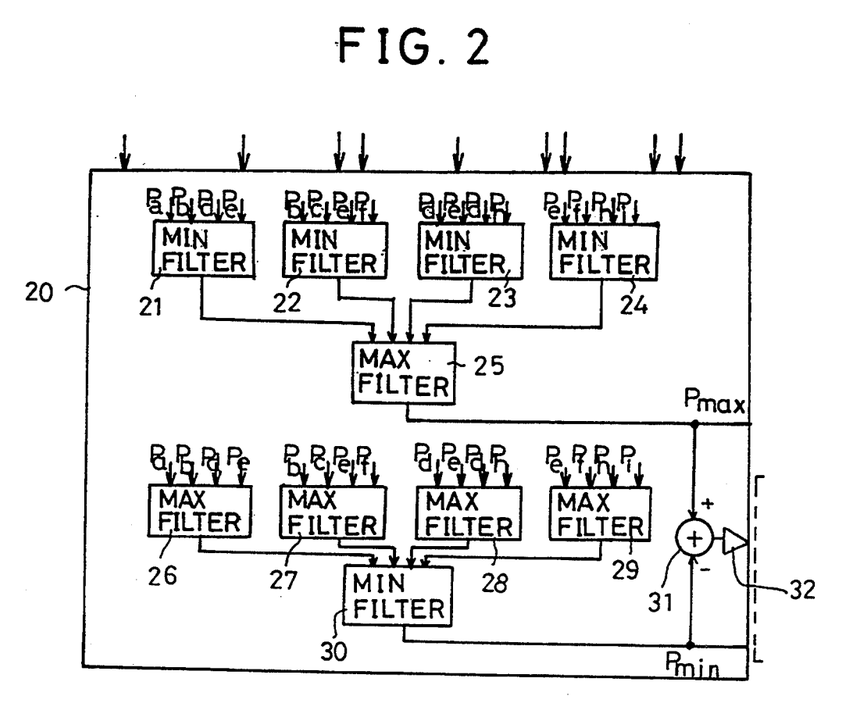
FIG. 2 is a detailed block diagram of a two-dimensional pseudo median filtering circuit in the luminance/color signal separation apparatus in FIG. 1.

Referring to FIG. 2, there is shown a detailed block diagram of the two-dimensional pseudo median filtering circuit 20 in the luminance/color signal separation apparatus in FIG. 1. The two-dimensional pseudo median filtering circuit 20 is constructed to output the first luminance signal Ypmed by performing an arithmetic operation for the composite video signal from the A/D converter 1 and the target composite video signal and the vertically and horizontally adjacent composite video signals from the adjacent signal detection circuit 10.

Namely, as shown in FIG. 2, the two-dimensional pseudo median filtering circuit 20 includes a first MIN filter 21 for selecting the minimum value among the composite video signal Pa from the A/D converter 1 and the composite video signal Pb from the first sample memory 11, the composite video signal Pd from the first line memory 13 and the target composite video signal Pe from the third sample memory 14 in the adjacent signal detection circuit 10 and filtering the selected composite video signal to extract a fourth luminance signal therefrom.

A second MIN filter 22 is provided in the two-dimensional pseudo median filtering circuit 20 to select the minimum value among the composite video signals Pb, Pc, Pe and Pf from the first to fourth sample memories 11, 12, 14 and 15 in the adjacent signal detection circuit 10 and filter the selected composite video signal to extract a fifth luminance signal therefrom.

A third MIN filter 23 is also provided in the two-dimensional pseudo median filtering circuit 20 to select the minimum value among the composite video signals Pd and Pg from the first and second line memories 13 and 16 and the composite video signals Pe and Ph from the third and fifth sample memories 14 and 17 in the adjacent signal detection circuit 10 and filter the selected composite video signal to extract a sixth luminance signal therefrom.

A fourth MIN filter 24 is also provided in the two-dimensional pseudo median filtering circuit 20 to select the minimum value among the composite video signals Pe, Pf, Ph and Pi from the third to sixth sample memories 14, 15, 17 and 18 in the adjacent signal detection circuit 10 and filter the selected composite video signal to extract a seventh luminance signal therefrom.

The two-dimensional pseudo median filtering circuit 20 also includes a first MAX filter 26 for selecting the maximum value among the composite video signal Pa from the A/D converter 1 and the composite video signal Pb from the first sample memory 11, the composite video signal Pd from the first line memory 13 and the target composite video signal Pe from the third sample memory 14 in the adjacent signal detection circuit 10 and filtering the selected composite video signal to extract an eighth luminance signal therefrom.

A second MAX filter 27 is also provided in the two-dimensional pseudo median filtering circuit 20 to select the maximum value among the composite video signals Pb, Pc, Pe and Pf from the first to fourth sample memories 11, 12, 14 and 15 in the adjacent signal detection circuit 10 and filter the selected composite video signal to extract a ninth luminance signal therefrom.

A third MAX filter 28 is also provided in the two-dimensional pseudo median filtering circuit 20 to select the maximum value among the composite video signals Pd and Pg from the first and second line memories 13 and 16 and the composite video signals Pe and Ph from the third and fifth sample memories 14 and 17 in the adjacent signal detection circuit 10 and filter the selected composite video signal to extract a tenth luminance signal therefrom.

A fourth MAX filter 29 is also provided in the two-dimensional pseudo median filtering circuit 20 to select the maximum value among the composite video signals Pe, Pf, Ph and Pi from the third to sixth sample memories 14, 15, 17 and 18 in the adjacent signal detection circuit 10 and filter the selected composite video signal to extract an eleventh luminance signal therefrom.

Also, the two-dimensional pseudo median filtering circuit 20 includes a fifth MAX filter 25 for selecting the maximum value among the fourth to seventh luminance signals from the first to fourth MIN filters 21-24, a fifth MIN filter 30 for selecting the minimum value among the eighth to eleventh luminance signals from the first to fourth MAX filters 26-29, a first adder 31 for adding output signals from the fifth MAX and MIN filters 25 and 30, and a first amplifier 32 for amplifying an output signal from the first adder 31 and outputting the amplified signal as the first luminance signal Ypmed.

Figure 3:
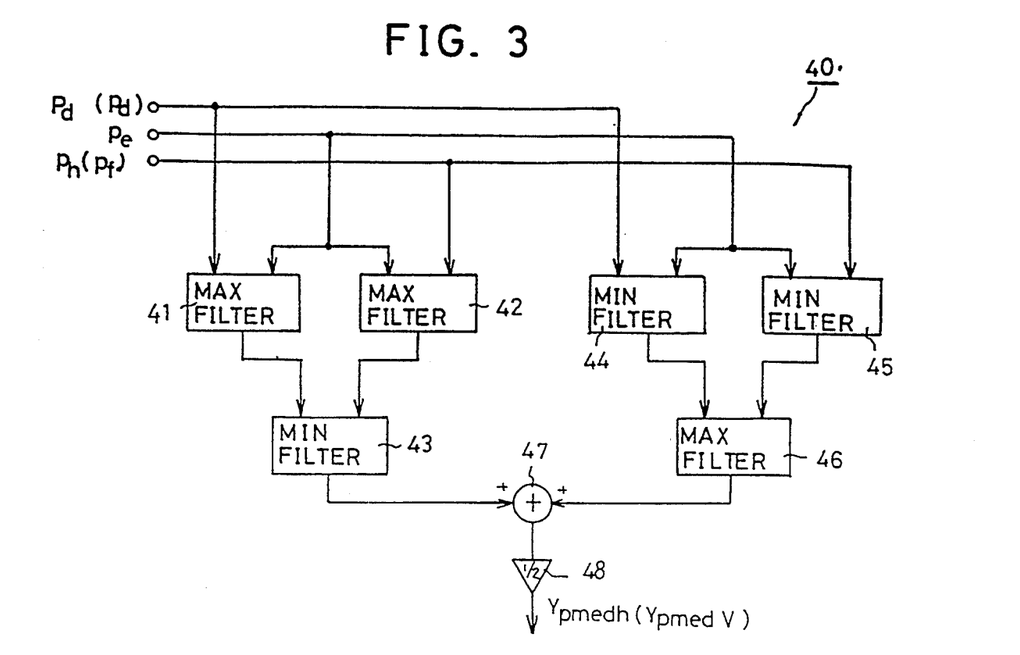
FIG. 3 is a detailed block diagram of a horizontal pseudo median filtering circuit in the luminance/color signal separation apparatus in FIG. 1.

Referring to FIG. 3, there is shown a detailed block diagram of the horizontal pseudo median filtering circuit 40 in the luminance/color signal separation apparatus in FIG. 1. The horizontal pseudo median filtering circuit 40 is constructed to output the second luminance signal Ypmedh by performing an arithmetic operation for the target composite video signal Pe and the horizontally adjacent composite video signals Pd and Pf from the adjacent signal detection circuit 10.

Namely, as shown in FIG. 3, the horizontal pseudo median filtering circuit 40 includes a sixth MAX filter 41 for selecting the maximum value of the composite video signal Pd from the first line memory 13 and the composite video signal Pe from the third sample memory 14 in the adjacent signal detection circuit 10 and filtering the selected composite video signal to extract a twelfth luminance signal therefrom.

A seventh MAX filter 42 is provided in the horizontal pseudo median filtering circuit 40 to select the maximum value of the composite video signals Pe and Pf from the third and fourth sample memories 14 and 15 in the adjacent signal detection circuit 10 and filter the selected composite video signal to extract a thirteenth luminance signal therefrom.

A sixth MIN filter 44 is also provided in the horizontal pseudo median filtering circuit 40 to select the minimum value of the composite video signal Pd from the first line memory 13 and the composite video signal Pe from the third sample memory 14 in the adjacent signal detection circuit 10 and filter the selected composite video signal to extract a fourteenth luminance signal therefrom.

A seventh MIN filter 45 is also provided in the horizontal pseudo median filtering circuit 40 to select the minimum value of the composite video signals Pe and Pf from the third and fourth sample memories 14 and 15 in the adjacent signal detection circuit 10 and filter the selected composite video signal to extract a fifteenth luminance signal therefrom.

The horizontal pseudo median filtering circuit 40 also includes an eighth MIN filter 43 for selecting the minimum value of the twelfth and thirteenth luminance signals from the sixth and seventh MAX filters 41 and 42, an eighth MAX filter 46 for selecting the maximum value of the fourteenth and fifteenth luminance signals from the sixth and seventh MIN filters 44 and 45, a second adder 47 for adding output signals from the eighth MIN and MAX filters 43 and 46, and a second amplifier 48 for amplifying an output signal from the second adder 47 and outputting the amplified signal as the second luminance signal Ypmedh.

Figure 4:
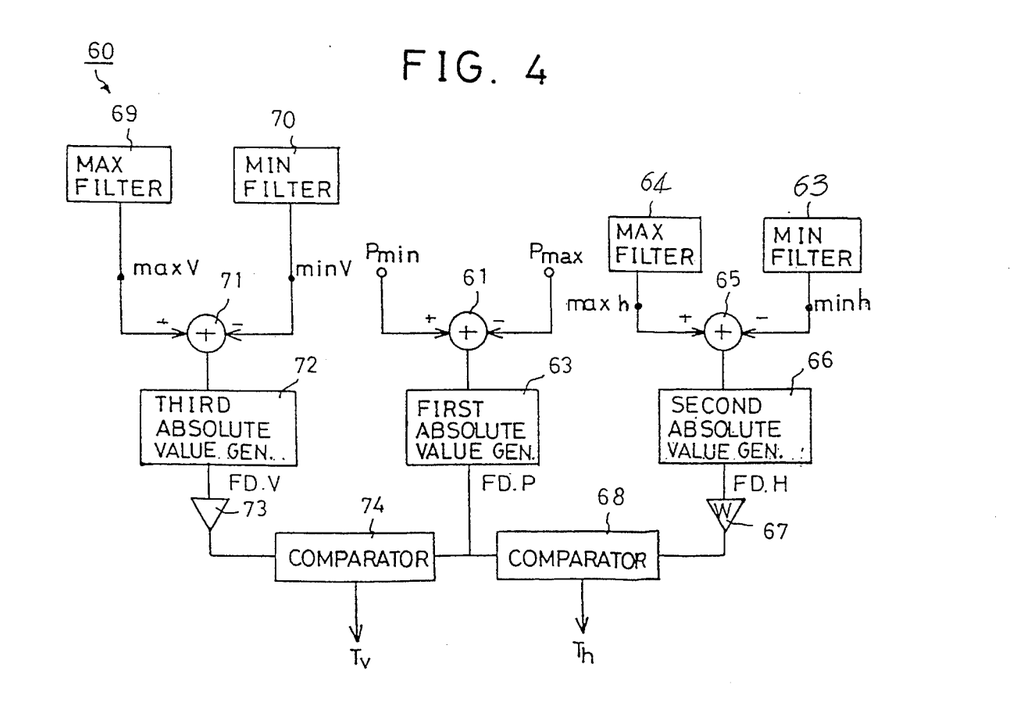
FIG. 4 is a detailed block diagram of a control signal generation circuit in the luminance/color signal separation apparatus in FIG. 1.
Figure 6:
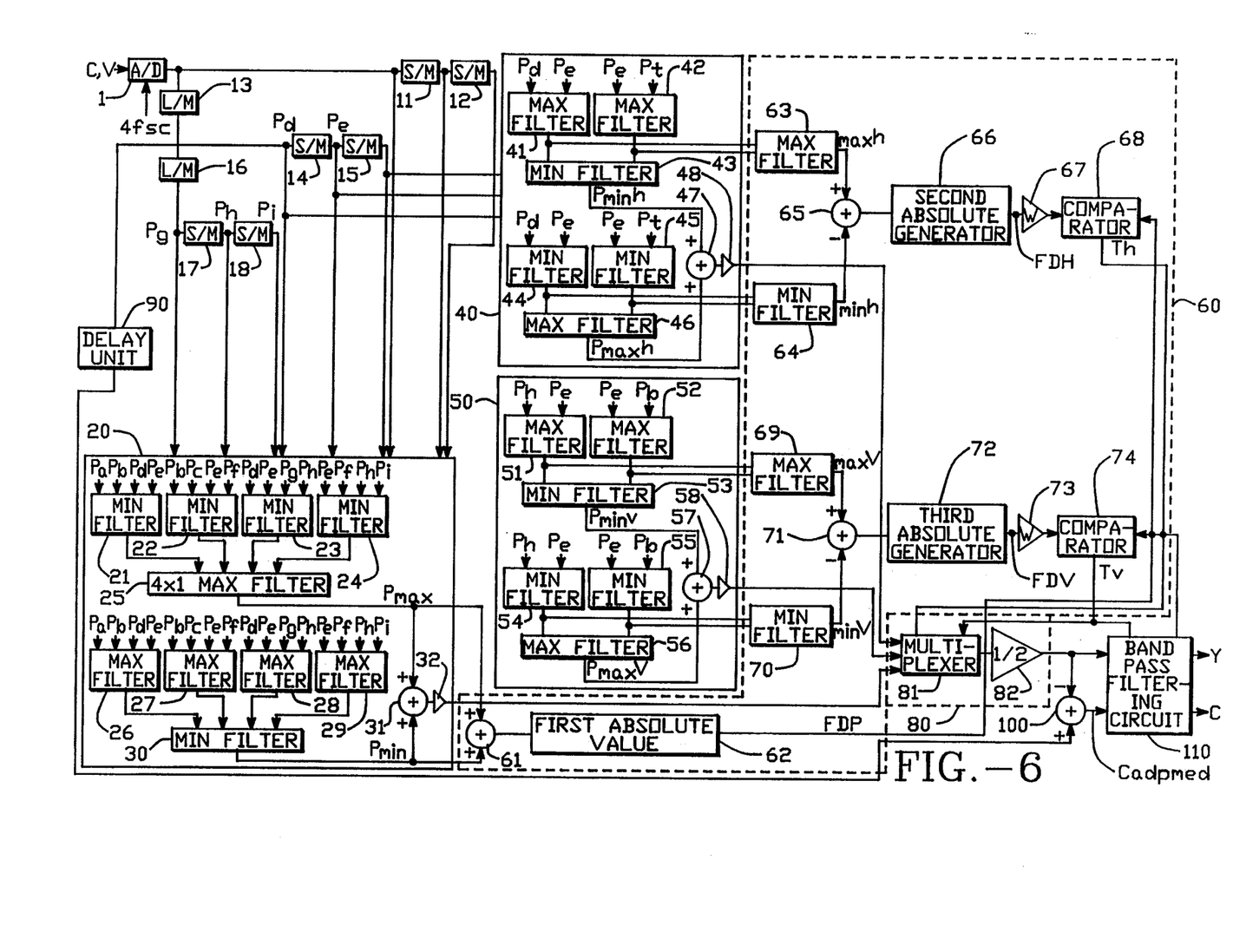
FIG. 6 is a detailed block diagram of the whole of the luminance/color signal separation apparatus in FIG. 1.

FIG. 4 is a detailed block diagram of the control signal generation circuit 60 in the luminance/color signal separation apparatus in FIGS. 1 and 6 is a detailed block diagram of the whole of the luminance/color signal separation apparatus in FIG. 1. As shown in FIG. 6, the vertical pseudo median filtering circuit 50 includes ninth to eleventh MAX filters 51, 52 and 56, ninth to eleventh MIN filters 53-55, a third adder 57 and a third amplifier 58 to output the third luminance signal Ypmedv by performing an arithmetic operation for the target composite video signal Pe and the vertically adjacent composite video signals Pb and Ph from the adjacent signal detection circuit 10 in the same manner as that of the horizontal pseudo median filtering circuit 40.

As shown in FIGS. 4 and 6, the control signal generation circuit 60 includes a first subtracter 61 for subtracting the output signals from the fifth MAX and MIN filters 25 and 30 in the two-dimensional pseudo median filtering circuit 20 with respect to each other, a first absolute value generator 62 for generating an absolute value of an output signal from the first subtracter 61, a twelfth MAX filter 63 for selecting the maximum value of the twelfth and thirteenth luminance signals from the sixth and seventh MAX filters 41 and 42 in the horizontal pseudo median filtering circuit 40, a twelfth MIN filter 64 for selecting the minimum value of the fourteenth and fifteenth luminance signals from the sixth and seventh MIN filters 44 and 45 in the horizontal pseudo median filtering circuit 40, a thirteenth MAX filter 69 for selecting the maximum value of sixteenth and seventeenth luminance signals from the ninth and tenth MAX filters 51 and 52 in the vertical pseudo median filtering circuit 50, and a thirteenth MIN filter 70 for selecting the minimum value of eighteenth and nineteenth luminance signals from the ninth and tenth MIN filters 54 and 55 in the vertical pseudo median filtering circuit 50.

The control signal generation circuit 60 also includes a second subtracter 65 for subtracting output signals from the twelfth MAX and MIN filters 63 and 64 with respect to each other, a second absolute value generator 66 for generating an absolute value of an output signal from the second subtracter 65, a fourth amplifier 67 for amplifying an output signal from the second absolute value generator 66 by a predetermined weighted value, and a first comparator 68 for comparing an output signal from the fourth amplifier 67 with an output signal from the first absolute value generator 62 and outputting the horizontal control signal Th in accordance with the compared result.

Also, the control signal generation circuit 60 includes a third subtracter 71 for subtracting output signals from the thirteenth MAX and MIN filters 69 and 70 with respect to each other, a third absolute value generator 72 for generating an absolute value of an output signal from the third subtracter 71, a fifth amplifier 73 for amplifying an output signal from the third absolute value generator 72 by the predetermined weighted value, and a second comparator 74 for comparing an output signal from the fifth amplifier 73 with the output signal from the first absolute value generator 62 and outputting the vertical control signal Tv in accordance with the compared result.

Also as shown in FIG. 6, the luminance signal selection circuit 80 includes a multiplexer 81 for selecting one of the first to third luminance signals Ypmed, Ypmedh and Ypmedv from the two-dimensional, horizontal and vertical pseudo median filtering circuits 20, 40 and 50 in response to the horizontal and vertical control signals Th and Tv from the control signal generation circuit 60, and an amplifier 82 for amplifying an output signal from the multiplexer 81 and outputting the amplified signal as the final luminance signal Yadpmed.

Figure 5:
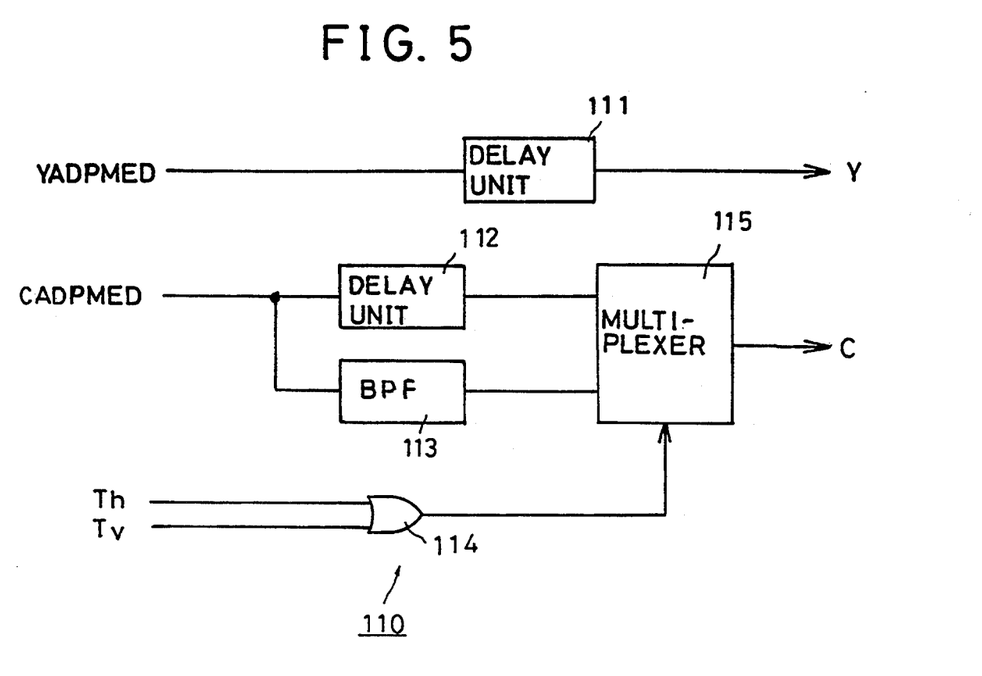
FIG. 5 is a detailed block diagram of a band pass filtering circuit in the luminance/color signal separation apparatus in FIG. 1.

Turning to FIG. 5, there is shown a detailed block diagram of the band pass filtering circuit 110 in the luminance/color signal separation apparatus in FIG. 1. As shown in this drawing, the band pass filtering circuit 110 includes a first delay unit 111 for delaying the final luminance signal Yadpmed from the luminance signal selection circuit 80 for a timing matching with the final color signal, a band pass filter 113 for filtering the color signal Cadpmed from the color signal extractor 100 at the narrow band, a second delay unit 112 for delaying the color signal Cadpmed from the color signal extractor 100 for a timing matching with an output signal from the band pass filter 113, an OR gate 114 for ORing the horizontal and vertical control signals Th and Tv from the control signal generation circuit 60, and a multiplexer 115 for selecting one of the output signal from the band pass filter 113 and the color signal Cadpmed delayed by the second delay unit 112 in response to an output signal from the OR gate 114 and outputting the selected signal as the final color signal.

The operation of the luminance/color signal separation apparatus with the above-mentioned construction in accordance with the present invention will hereinafter be described in detail with reference to FIGS. 1 to 9.

Figure 7:
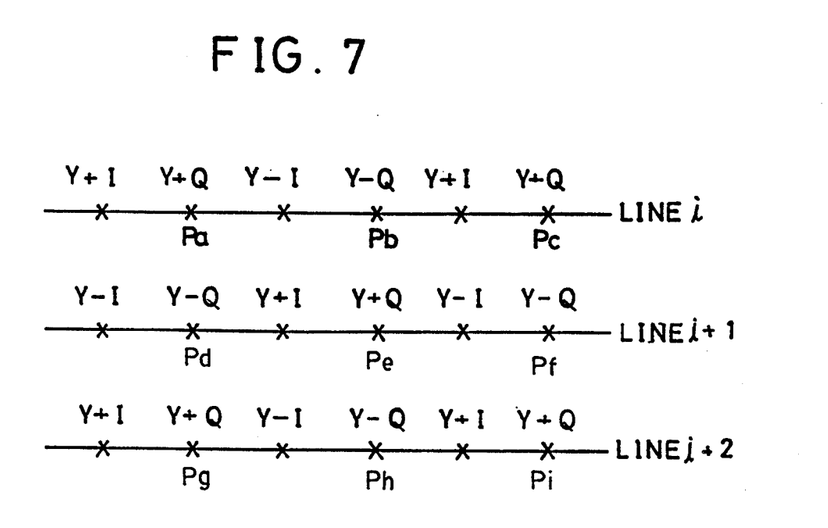
FIG. 7 is a view illustrating an array of composite video signals which are obtained by line and sample-delaying an input composite video signal in accordance with the present invention.
Figure 8:
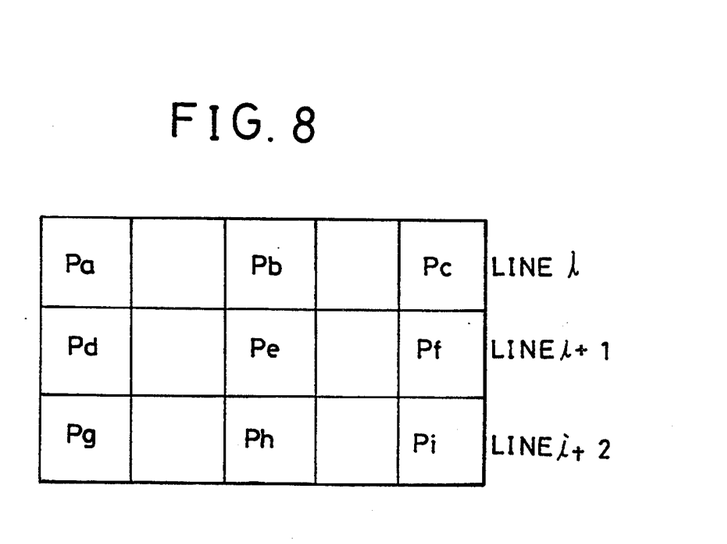
FIG. 8 is a table illustrating nine of the obtained composite video signals in FIG. 7.

FIG. 7 is a view illustrating an array of the composite video signals which are obtained by line and sample-delaying the input composite video signal in accordance with the present invention and FIG. 8 is a table illustrating nine of the obtained composite video signals in FIG. 7. Herein, the operation of the luminance/color signal separation apparatus will be described on the basis of the nine composite video signals Pa–Pi in FIG. 8 for the purpose of illustration and description.

First, upon receiving a quadrature-modulated composite video signal, the A/D converter 1 samples the received composite video signal at a rate of four times as many as that of a color subcarrier and converts the sampled composite video signal into the digital composite video signal Pa.

In the adjacent signal detection circuit 10, the first sample memory 11 delays the composite video signal pa from the A/D converter 1 by two samples and the second sample memory 12 delays the resultant composite video signal Pb from the first sample memory 11 by two samples. The composite video signal pa from the A/D converter 1 is also delayed by one line by the first line memory 13. The third sample memory 14 delays the resultant composite video signal Pd from the first line memory 13 by two samples and outputting the resultant composite video signal Pe as the target composite video signal. The fourth sample memory 15 delays the target composite video signal Pe from the third sample memory 14 by two samples. Also, the composite video signal Pd from the first line memory 13 is delayed by one line by the second line memory 16. The fifth sample memory 17 delays the resultant composite video signal Pg from the second line memory 16 by two samples. The sixth sample memory 18 delays the resultant composite video signal Ph from the fifth sample memory 17 by two samples. As a result, the adjacent signal detection circuit 10 outputs the target composite video signal Pe and the composite video signals Pb–Pd and Pf–Pi vertically and horizontally adjacent thereto.

The target composite video signal Pe and the vertically and horizontally adjacent composite video signals Pb–Pd and Pf–Pi from the adjacent signal detection circuit 10 and the composite video signal Pa from the A/D converter 1 are applied to the two-dimensional pseudo median filtering circuit 20.

In the two-dimensional pseudo median filtering circuit 20, the first MIN and MAX filters 21 and 26 select the minimum and maximum values among the composite video signal Pa from the A/D converter 1 and the composite video signals Pb, Pd and Pe from the adjacent signal detection circuit 10 and filter the selected composite video signals, respectively. As a result, the fourth and eighth luminance signals are outputted from the first MIN and MAX filters 21 and 26, respectively. The second MIN and MAX filters 22 and 27 select the minimum and maximum values among the composite video signals Pb, Pc, Pe and Pf from the adjacent signal detection circuit 10 and filter the selected composite video signals, respectively. As a result, the fifth and ninth luminance signals are outputted from the second MIN and MAX filters 22 and 27, respectively. Also, the third MIN and MAX filters 23 and 28 select the minimum and maximum values among the composite video signals Pd, Pe, Pg and Ph from the adjacent signal detection circuit 10 and filter the selected composite video signals, respectively. As a result, the sixth and tenth luminance signals are outputted from the third MIN and MAX filters 23 and 28, respectively. On the other hand, the fourth MIN and MAX filters 24 and 29 select the minimum and maximum values among the composite video signals Pe, Pf, Ph and Pi from the adjacent signal detection circuit 10 and filter the selected composite video signals, respectively. As a result, the seventh and eleventh luminance signals are outputted from the fourth MIN and MAX filters 24 and 29, respectively.

Then, the fifth MAX filter 25 selects the maximum value Pmax among the fourth to seventh luminance signals from the first to fourth MIN filters 21–24 and the fifth MIN filter 30 selects the minimum value Pmin among the eighth to eleventh luminance signals from the first to fourth MAX filters 26–29. The output signals Pmax and Pmin from the fifth MAX and MIN filters 25 and 30 are added by the first adder 31 and then amplified by the first amplifier 32. As a result outputted from the first amplifier 32 is the first luminance signal Ypmed which can be expressed by the following equation (1):

$$Ypmed = 0.5 \, \text{Min}\{\text{Max}(Pa, Pb, Pd, Pe), \text{Max}(Pb, Pc, Pe, Pf), \text{Max}(Pd, Pe, Pg, Ph), \text{Max}(Pe, Pf, Ph,$$

Pi)}+0.5 Max{Min(Pa, Pb, Pd, Pe), Min(Pb, Pc, Pe, Pf), Min(Pd, Pe, Pg, Ph), Min(Pe, Pf, Ph, Pi)}  (1)

Where, defining Pmax as Min{Max(Pa, Pb, Pd, Pe), Max(Pb, Pc, Pe, Pf), Max(Pd, Pe, Pg, Ph), Max(Pe, Pf, Ph, Pi)} and Pmin as Max{Min(Pa, Pb, Pd, Pe), Min(Pb, Pc, Pe, Pf), Min(Pd, Pe, Pg, Ph), Min(Pe, Pf, Ph, Pi)}, the first luminance signal Ypmed can be expressed by the following equation (2):

$$Ypmed = 0.5(Pmax + Pmin) \quad (2)$$

Also, the target composite video signal Pe and the horizontally adjacent composite video signals Pd and Pf from the adjacent signal detection circuit 10 are applied to the horizontal pseudo median filtering circuit 40.

In the horizontal pseudo median filtering circuit 40, the sixth MAX and MIN filters 41 and 44 select the maximum and minimum values of the composite video signals Pd and Pe from the adjacent signal detection circuit 10 and filter the selected composite video signals, respectively. As a result, the twelfth and fourteenth luminance signals are outputted from the sixth MAX and MIN filters 41 and 44, respectively. Also, the seventh MAX and MIN filters 42 and 45 select the maximum and minimum values of the composite video signals Pe and Pf from the adjacent signal detection circuit 10 and filter the selected composite video signals, respectively. As a result, the thirteenth and fifteenth luminance signals are outputted from the seventh MAX and MIN filters 42 and 45, respectively.

Then, the eighth MIN filter 43 selects the minimum value Pminh of the twelfth and thirteenth luminance signals from the sixth and seventh MAX filters 41 and 42 and the eighth MAX filter 46 selects the maximum value Pmaxh of the fourteenth and fifteenth luminance signals from the sixth and seventh MIN filters 44 and 45. The output signals Pminh and Pmaxh from the eighth MIN and MAX filters 43 and 46 are added by the second adder 47 and then amplified by the second amplifier 48. As a result outputted from the second amplifier 48 is the second luminance signal Ypmedh which can be expressed by the following equation (3):

$$Ypmedh = 0.5 \, Max\{Min(Pd, Pe), Min(Pe, Pf)\} + 0.5 \, Min\}Max(Pd, Pe), Max(Pe, Pf)\} \quad (3)$$

Where, defining Pmaxh as Max{Min(Pd, Pe), Min(Pe, Pf)} and Pminh as Min{Max(Pd, Pe), Max(Pe, Pf)}, the second luminance signal Ypmedh can be expressed by the following equation:

$$Ypmedh = 0.5(Pmaxh + Pminh)$$

Also, the target composite video signal Pe and the vertically adjacent composite video signals Pb and Ph from the adjacent signal detection circuit 10 are applied to the vertical pseudo median filtering circuit 50.

In the vertical pseudo median filtering circuit 50, the ninth MAX and MIN filters 51 and 54 select the maximum and minimum values of the composite video signals Ph and Pe from the adjacent signal detection circuit 10 and filter the selected composite video signals, respectively. As a result, the sixteenth and eighteenth luminance signals are outputted from the ninth MAX and MIN filters 51 and 54, respectively. Also, the tenth MAX and MIN filters 52 and 55 select the maximum and minimum values of the composite video signals Pe and Pb from the adjacent signal detection circuit 10 and filter the selected composite video signals, respectively.

As a result, the seventeenth and nineteenth luminance signals are outputted from the tenth MAX and MIN filters 52 and 55, respectively.

Then, the eleventh MIN filter 53 selects the minimum value Pminv of the sixteenth and seventeenth luminance signals from the ninth and tenth MAX filters 51 and 52 and the eleventh MAX filter 56 selects the maximum value Pmaxv of the eighteenth and nineteenth luminance signals from the ninth and tenth MIN filters 54 and 55. The output signals Pminv and Pmaxv from the eleventh MIN and MAX filters 53 and 56 are added by third second adder 57 and then amplified by the third amplifier 58. As a result outputted from the third amplifier 58 is the third luminance signal Ypmedv which can be expressed by the following equation (4):

$$Ypmedv = 0.5 \, Max\{Min(Pb, Pe), Min(Pe, Ph)\} + 0.5 \, Min\{Max(Pb, Pe), Max(Pe, Ph)\} \quad (4)$$

Where, defining Pmaxv as Max{Min(Pb, Pe), Min(Pe, Ph)} and Pminv as Min{Max(Pb, Pe), Max(Pe, Ph)}, the third luminance signal Ypmedv can be expressed by the following equation:

$$Ypmedv = 0.5(Pmaxv + Pminv)$$

In the control signal generation circuit 60, the first subtracter 61 subtracts the output signals Pmax and Pmin from the fifth MAX and MIN filters 25 and 30 in the two-dimensional pseudo median filtering circuit 20 with respect to each other. The first absolute value generator 62 generates the absolute value FDP of the output signal from the first subtracter 61.

Also, the twelfth MAX filter 63 selects the maximum value maxh of the twelfth and thirteenth luminance signals from the sixth and seventh MAX filters 41 and 42 in the horizontal pseudo median filtering circuit 40 and the twelfth MIN filter 64 selects the minimum value minh of the fourteenth and fifteenth luminance signals from the sixth and seventh MIN filters 44 and 45 in the horizontal pseudo median filtering circuit 40. Here, the output signal maxh from the twelfth MAX filter 63 is a luminance signal which is separated from the maximum value of the target composite video signal Pe and the horizontally adjacent composite video signals Pd and Pf. Also, the output signal minh from the twelfth MIN filter 64 is a luminance signal which is separated from the minimum value of the target composite video signal Pe and the horizontally adjacent composite video signals Pd and Pf.

Then, the second subtracter 65 subtracts the output signals maxh and minh from the twelfth MAX and MIN filters 63 and 64 with respect to each other and the second absolute value generator 66 generates the absolute value FDH of the output signal from the second subtracter 65. The fourth amplifer 67 amplifies the output signal FDH from the second absolute value generator 66 by the predetermined weighted value W and outputs the amplified signal WFDH to the first comparator 68.

The first comparator 68 compares the output signal WFDH from the fourth amplifier 67 with the output signal FDP from the first absolute value generator 62 and outputs the horizontal control signal Th in accordance with the compared result. Namely, if the output signal EDP from the first absolute value generator 62 is higher than the output signal WFDH from the fourth amplifier 67, the first comparator 68 outputs the horizontal control signal Th of a high level. On the contrary, if the output signal FDP from the first absolute value generator 62 is not higher than the output signal WFDH from the fourth amplifier 67, the first comparator 68 outputs the horizontal control signal Th of a low level.

Also, the thirteenth MAX filter 69 selects the maximum value maxv of the sixteenth and seventeenth luminance signals from the ninth and tenth MAX filters 51 and 52 in the vertical pseudo median filtering circuit 50 and the thirteenth MIN filter 70 selects the minimum value minv of the eighteenth and nineteenth luminance signals from the ninth and tenth MIN filters 54 and 55 in the vertical pseudo median filtering circuit 50. Here, the output signal maxv from the thirteenth MAX filter 69 is a luminance signal which is separated from the maximum value of the target composite video signal Pe and the vertically adjacent composite video signals Pb and Ph. Also, the output signal minv from the thirteenth MIN filter 70 is a luminance signal which is separated from the minimum value of the target composite video signal Pe and the vertically adjacent composite video signals Pb and Ph.

Then, the third subtracter 71 subtracts the output signals maxv and minv from the thirteenth MAX and MIN filters 69 and 70 with respect to each other and the third absolute value generator 72 generates the absolute value FDV of the output signal from the third subtracter 71. The fifth amplifier 73 amplifies the output signal FDV from the third absolute value generator 72 by the predetermined weighted value W and outputs the amplified signal WFDV to the second comparator 74.

The second comparator 74 compares the output signal WFDV from the fifth amplifier 73 with the output signal FDP from the first absolute value generator 62 and outputs the vertical control signal Tv in accordance with the compared result. Namely, if the output signal FDP from the first absolute value generator 62 is higher than the output signal WFDV from the fifth amplifier 73, the second comparator 74 outputs the vertical control signal Tv of a high level. On the contrary, if the output signal FDP from the first absolute value generator 62 is not higher than the output signal WFDV from the fifth amplifier 73, the second comparator 74 outputs the vertical control signal Tv of a low level.

The luminance signal selection circuit 80 is adapted to select one of the first to third luminance signals Ypmed, Ypmedh and Ypmedv from the two-dimensional, horizontal and vertical pseudo median filtering circuits 20, 40 and 50 in response to the horizontal and vertical control signals Th and Tv from the control signal generation circuit 60 and output the selected luminance signal as the final luminance signal Yadpmed. Namely, when the horizontal and vertical control signals Th and Tv from the control signal generation circuit 60 are high and low, respectively, the second luminance signal Ypmedh from the horizontal pseudo median filtering circuit 40 is selected by the multiplexer 81. Also, when the horizontal and vertical control signals Th and Tv from the control signal generation circuit 60 are low and high, respectively, the third luminance signal Ypmedv from the vertical pseudo median filtering circuit 50 is selected by the multiplexer 81.

On the other hand, when both the horizontal and vertical control signals Th and Tv from the control signal generation circuit 60 are low or high, the first luminance signal Ypmed from the two-dimensional pseudo median filtering circuit 20 is selected by the multiplexer 81. The luminance signal Ypmed, Ypmedh or Ypmedv selected by the multiplexer 81 is amplified by the amplifier 82 and then outputted as the final luminance signal Yadpmed.

In other words, the correlation of the inputted composite video signal is horizontally high and vertically low under the condition that the horizontal and vertical control signals Th and Tv from the control signal generation circuit 60 are high and low, respectively. Also, the correlation of the inputted composite video signal is horizontally low and vertically high under the condition that the horizontal and vertical control signals Th and Tv from the control signal generation circuit 60 are low and high, respectively. When both the horizontal and vertical control signals Th and Tv from the control signal generation circuit 60 are low, the correlation of three consecutive lines of the inputted composite video signal is high. On the contrary, when both the horizontal and vertical control signals Th and Tv from the control signal generation circuit 60 are high, the correlation of three consecutive lines of the inputted composite video signal is low.

On the other hand, the target composite video signal Pe from the adjacent signal detection circuit 10 is delayed by the predetermined time period by the delay unit 90 for the timing matching with the luminance signal Yadpmed from the luminance signal selection circuit 80, and then applied to the color signal extractor 100. As a result, the color signal extractor 100 removes the luminance signal Yadpmed from the luminance signal selection circuit 80 from the target composite video signal Pe delayed by the delay unit 90 for extraction of the color signal Cadpmed. Then, the color signal Cadpmed extracted by the color signal extractor 100 is applied to the band pass filtering circuit 110.

The band pass filtering circuit 110 is adapted to filter the color signal Cadpmed from the color signal extractor 100 at the narrow band to remove the color spread phenomenon thereof. Namely, in the band pass filtering circuit 110, the final luminance signal Yadpmed from the luminance signal selection circuit 80 is delayed by the first delay unit 111 for the timing matching with the final color signal. The color signal Cadpmed from the color signal extractor 100 is filtered at the narrow band by the band pass filter 113 and then applied to the multiplexer 115. Also, the color signal Cadpmed from the color signal extractor 100 is delayed by the second delay unit 112 for the timing matching with the output signal from the band pass filter 113 and then applied to the multiplexer 115.

The horizontal and vertical control signals Th and Tv from the control signal generation circuit 60 are ORed by the OR gate 114, which outputs the ORed signal to the multiplexer 115. In response to the output signal from the OR gate 114, the multiplexer 115 selects one of the output signal from the band pass filter 113 and the color signal Cadpmed delayed by the second delay unit 112 outputs the selected signal as the final color signal.

Figure 9:
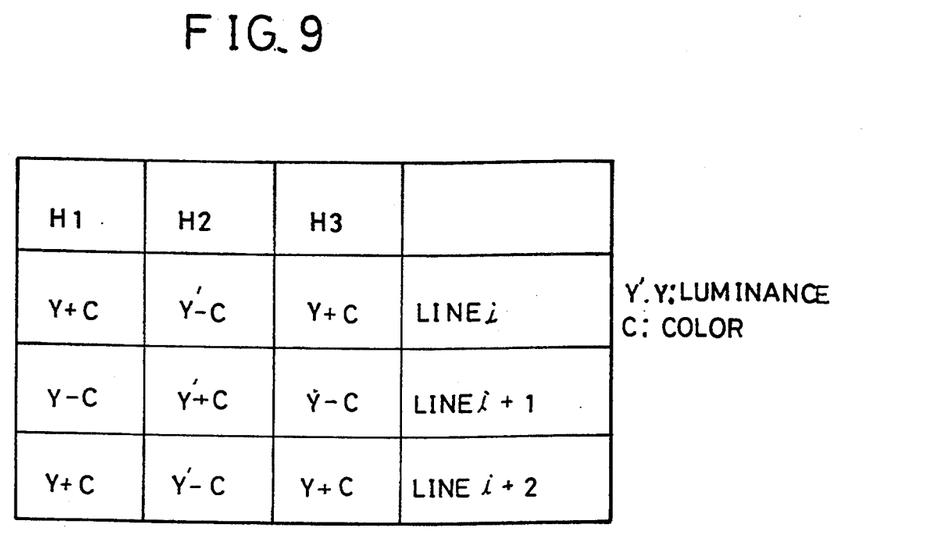
FIG. 9 is a table illustrating an example of composite video signals which are obtained by line and sample-delaying the input composite video signal in accordance with the present invention.

FIG. 9 is a table illustrating an example of composite video signals which are obtained by line and sample-delaying the input composite video signal in accordance with the present invention. Assuming that the input composite video signal has the horizontal variation, luminance signals Y and Y' can be expressed by the following inequality:

$Y << Y'$

In this case, the output value FDP from the first absolute value generator 62 is $|Y'-Y+2C|$, the output value FDH from the second absolute value generator 66 is $|Y'-Y+2C|$ and the output value FDV from the third absolute value generator 72 is $|2C|$. As a result, the horizontal control signal Th is low since W×FDH>FDP, and the vertical control signal Tv is high since W×FDV<FDP. Therefore, the third luminance signal Ypmedv from the vertical pseudo median filtering circuit 50 is outputted from the luminance signal selection circuit 80.

As apparent from the above description, according to the present invention, the luminance signal from the vertical pseudo median filtering circuit is selected when the correlation of the composite video signal is vertically high. Also, the luminance signal from the horizontal pseudo median filtering circuit is selected when the correlation of the composite video signal is horizontally high. Further, the luminance signal from the two-dimensional pseudo median filtering circuit is selected when the correlation of the composite video signal is high all horizontally, vertically and diagonally. Therefore, a cross luminance phenomenon and a cross color phenomenon can be suppressed, resulting in a definition in a picture quality.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A luminance/color signal separation apparatus comprising:

analog/digital conversion means for sampling a composite video signal inputted therein at a desired rate and converting the sampled composite video signal into a digital composite video signal;

adjacent signal detection means for detecting from the composite video signal from said analog/digital conversion means a target composite video signal from which luminance and color signals are to be separated and composite video signals vertically and horizontally adjacent to the target composite video signal; said adjacent signal detection means including, a first sample memory for delaying the composite video signal from said analog/digital conversion means by two samples;

a second sample memory for delaying the resultant composite video signal from said first sample memory by two samples;

a first line memory for delaying the composite video signal from said analog/digital conversion means by one line;

a third sample memory for delaying the resultant composite video signal from said first line memory by two samples and outputting the resultant composite video signal as the target composite video signal;

a fourth sample memory for delaying the target composite video signal from said third sample memory by two samples;

a second line memory for delaying the resultant composite video signal from said first line memory by one line;

a fifth sample memory for delaying the resultant composite video signal from said second line memory by two samples; and a sixth sample memory for delaying the resultant composite video signal from said fifth sample memory by two samples;

two-dimensional pseudo median filtering means for obtaining a correlation of the composite video signal from said analog/digital conversion means and the target composite video signal and the vertically and horizontally adjacent composite video signals from said adjacent signal detection means and filtering those composite video signals to extract a first luminance signal therefrom when the target composite video signal has vertical, horizontal and diagonal variations; wherein said two-dimensional pseudo median filtering means is constructed to output the first luminance signal by performing an arithmetic operation for the composite video signal from said analog/digital conversion means and the target composite video signal and the vertically and horizontally adjacent composite video signals from said adjacent signal detection means; and wherein said two-dimensional pseudo median filtering means including, a first MIN filter for selecting the minimum value among the composite video signal from said analog/digital conversion means and the composite video signal from said first sample memory, the composite video signal from said first line memory and the target composite video signal from said third sample memory in said adjacent signal detection means and filtering the selected composite video signal to extract a fourth luminance signal therefrom;

a second MIN filter for selecting the minimum value among the composite video signals from said first to fourth sample memories in said adjacent signal detection means and filtering the selected composite video signal to extract a fifth luminance signal therefrom;

a third MIN filter for selecting the minimum value among the composite video signals from said first and second line memories and the composite video signals from said third and fifth sample memories in said adjacent signal detection means and filtering the selected composite video signal to extract a sixth luminance signal therefrom;

a fourth MIN filter for selecting the minimum value among the composite video signals from said third to sixth sample memories in said adjacent signal detection means and filtering the selected composite video signal to extract a seventh luminance signal therefrom;

a first MAX filter for selecting the maximum value among the composite video signal from said analog/digital conversion means and the composite video signal from said first sample memory, the composite video signal from said first line memory and the target composite video signal from said third sample memory in said adjacent signal detection means and filtering the selected composite video signal to extract an eighth luminance signal therefrom;

a second MAX filter for selecting the maximum value among the composite video signals from said first to fourth sample memories in said adjacent signal detection means and filtering the selected composite video signal to extract a ninth luminance signal therefrom;

a third MAX filter for selecting the maximum value among the composite video signals from said first and second line memories and the composite video signals from said third and fifth sample memories is said adjacent signal detection means and filtering the selected composite video signal to extract a tenth luminance signal therefrom;

a fourth MAX filter for selecting the maximum value among the composite video signals from said third to sixth sample memories in said adjacent signal detection means and filtering the selected composite video signal to extract an eleventh luminance signal therefrom;

a fifth MAX filter for selecting the maximum value among the fourth to seventh luminance signals from said first to fourth MIN filters;

a fifth MIN filter for selecting the minimum value among the eighth to eleventh luminance signals from said first to fourth MAX filters;

a first adder for adding output signals from said fifth MAX and MIN filters; and a first amplifier for amplifying an output signal from said first adder and outputting the amplified signal as the first luminance signal;

horizontal pseudo median filtering means for obtaining a correlation of the target composite video signal and the horizontally adjacent composite video signals from said adjacent signal detection means and filtering those composite video signals to extract a second luminance signal therefrom;

vertical pseudo median filtering means for obtaining a correlation of the target composite video signal and the vertically adjacent composite video signals from said adjacent signal detection means and filtering those composite video signals to extract a third luminance signal therefrom;

control signal generation means for generating horizontal and vertical control signals to select one of the first to third luminance signals from said two-dimensional, horizontal and vertical pseudo median filtering means;

luminance signal selection means for selecting one of the first to third luminance signals from said two-dimensional, horizontal and vertical pseudo median filtering means in response to the horizontal and vertical control signals from said control signal generation means and outputting the selected luminance signal as the final luminance signal;

delay means for delaying the target composite video signal from said adjacent signal detection means by a predetermined time period for a timing matching with the final luminance signal from said luminance signal selection means;

color signal extraction means for removing the final luminance signal from said luminance signal selection means from the target composite video signal delayed by said delay means to extract a color signal therefrom; and band pass filtering means for filtering the color signal from said color signal extraction means at a narrow band to remove a color spread phenomenon thereof.

2. A luminance/color signal separation apparatus as set forth in claim 1, wherein said horizontal pseudo median filtering means is constructed to output the second luminance signal by performing an arithmetic operation for the target composite video signal and the horizontally adjacent composite video signals from said adjacent signal detection means.

3. A luminance/color signal separation apparatus as set forth in claim 2 wherein said horizontal pseudo median filtering means includes:

a sixth MAX filter for selecting the maximum value of the composite video signal from said first line memory and the composite video signal from said third sample memory in said adjacent signal detection means and filtering the selected composite video signal to extract a twelfth luminance signal therefrom;

a seventh MAX filter for selecting the maximum value of the composite video signals from said third and fourth sample memories in said adjacent signal detection means and filtering the selected composite video signal to extract a thirteenth luminance signal therefrom;

a sixth MIN filter for selecting the minimum value of the composite video signal from said first line memory and the composite video signal from said third sample memory in said adjacent signal detection means and filtering the selected composite video signal to extract a fourteenth luminance signal therefrom;

a seventh MIN filter for selecting the minimum value of the composite video signals from said third and fourth sample memories in said adjacent signal detection means and filtering the selected composite video signal to extract a fifteenth luminance signal therefrom;

an eighth MIN filter for selecting the minimum value of the twelfth and thirteenth luminance signals from said sixth and seventh MAX filters;

an eighth MAX filter for selecting the maximum value of the fourteenth and fifteenth luminance signals from said sixth and seventh MIN filters;

a second adder for adding output signals from said eighth MIN and MAX filters; and a second amplifier for amplifying an output signal from said second adder and outputting the amplified signal as the second luminance signal.

4. A luminance/color signal separation apparatus as set forth in claim 3, wherein said vertical pseudo median filtering means includes ninth to eleventh MAX filters, ninth to eleventh MIN filters, a third adder and a third amplifier to output the third luminance signal by performing an arithmetic operation for the target composite video signal and the vertically adjacent composite video signals from said adjacent signal detection means in the same manner as that of said horizontal pseudo median filtering means.

5. A luminance/color signal separation apparatus as set forth in claim 4, wherein said control signal generation means includes:

a first subtracter for subtracting the output signals from said fifth MAX and MIN filters in said two-dimensional pseudo median filtering means with respect to each other;

a first absolute value generator for generating an absolute value of an output signal from said first subtracter;

a twelfth MAX filter for selecting the maximum value of the twelfth and thirteenth luminance signals from said sixth and seventh MAX filters in said horizontal pseudo median filtering means;

a twelfth MIN filter for selecting the minimum value of the fourteenth and fifteenth luminance signals from said sixth and seventh MIN filters in said horizontal pseudo median filtering means;

a thirteenth MAX filter for selecting the maximum value of sixteenth and seventeenth luminance signals from said ninth and tenth MAX filters in said vertical pseudo median filtering means;

a thirteenth MIN filter for selecting the minimum value of eighteenth and nineteenth luminance signals from said ninth and tenth MIN filters in said vertical pseudo median filtering means;

a second subtracter for subtracting output signals from said twelfth MAX and MIN filters with respect to each other;

a second absolute value generator for generating an absolute value of an output signal from said second subtracter;

a fourth amplifier for amplifying an output signal from said second absolute value generator by a predetermined weighted value;

a first comparator for comparing an output signal from said fourth amplifier with an output signal from said first absolute value generator and outputting the horizontal control signal in accordance with the compared result;

a third subtracter for subtracting output signals from said thirteenth MAX and MIN filters with respect to each other;

a third absolute value generator for generating an absolute value of an output signal from said third subtracter;

a fifth amplifier for amplifying an output signal from said third absolute value generator by the predetermined weighted value; and a second comparator for comparing an output signal from said fifth amplifier with the output signal from said first absolute value generator and outputting the vertical control signal in accordance with the compared result.

6. A luminance/color signal separation apparatus comprising:

analog/digital conversion means for sampling a composite video signal inputted therein at a desired rate and converting the sampled composite video signal into a digital composite video signal;

adjacent signal detection means for detecting from the composite video signal from said analog/digital conversion means a target composite video signal from which luminance and color signals are to be separated and composite video signals vertically and horizontally adjacent to the target composite video signal;

two-dimensional pseudo median filtering means for obtaining a correlation of the composite video signal from said analog/digital conversion means and the target composite video signal and the vertically and horizontally adjacent composite video signals from said adjacent signal detection means and filtering those composite video signals to extract a first luminance signal therefrom when the target composite video signal has vertical, horizontal and diagonal variations;

horizontal pseudo median filtering means for obtaining a correlation of the target composite video signal and the horizontally adjacent composite video signals from said adjacent signal detection means and filtering those composite video signals to extract a second luminance signal therefrom;

vertical pseudo median filtering means for obtaining a correlation of the target composite video signal and the vertically adjacent composite video signals from said adjacent signal detection means and filtering those composite video signals to extract a third luminance signal therefrom;

control signal generation means for generating horizontal and vertical control signals to select one of the first to third luminance signals from said two-dimensional, horizontal and vertical pseudo median filtering means;

luminance signal selection means for selecting one of the first to third luminance signals from said two-dimensional, horizontal and vertical pseudo median filtering means in response to the horizontal and vertical control signals from said control signal generation means and outputting the selected luminance signal as the final luminance signal;

delay means for delaying the target composite video signal from said adjacent signal detection means by a predetermined time period for a timing matching with the final luminance signal from said luminance signal selection means;

color signal extraction means for removing the final luminance signal from said luminance signal selection means from the target composite video signal delayed by said delay means to extract a color signal therefrom; and band pass filtering means for filtering the color signal from said color signal extraction means at a narrow band to remove a color spread phenomenon thereof wherein said band pass filtering means includes:

a first delay unit for delaying the final luminance signal from said luminance signal selection means for a timing matching with the final color signal;

a band pass filter for filtering the color signal from said color signal extraction means at the narrow band;

a second delay unit for delaying the color signal from said color signal extraction means for a timing matching with an output signal from said band pass filter;

an OR gate for ORing the horizontal and vertical control signals from said control signal generation means; and a multiplexer for selecting one of the output signal from said band pass filter and the color signal delayed by said second delay unit in response to an output signal from said OR gate and outputting the selected signal as the final color signal.

* * * * *